United States Patent
Asghar et al.

(10) Patent No.: US 10,754,025 B2
(45) Date of Patent: Aug. 25, 2020

(54) RADAR AND CAMERA-BASED DATA FUSION

(71) Applicant: Rapsodo Pte. Ltd., Singapore (SG)

(72) Inventors: Sayed Zeeshan Asghar, Singapore (SG); Batuhan Okur, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 212 days.

(21) Appl. No.: 16/013,305

(22) Filed: Jun. 20, 2018

(65) Prior Publication Data

US 2019/0391254 A1   Dec. 26, 2019

(51) Int. Cl.
| | |
|---|---|
| *G01S 13/86* | (2006.01) |
| *G06T 7/246* | (2017.01) |
| *G06T 7/73* | (2017.01) |
| *H04N 5/232* | (2006.01) |
| *G06K 9/62* | (2006.01) |
| *G01S 13/72* | (2006.01) |

(Continued)

(52) U.S. Cl.
CPC ............ *G01S 13/867* (2013.01); *G01S 13/58* (2013.01); *G01S 13/723* (2013.01); *G06K 9/00536* (2013.01); *G06K 9/6289* (2013.01); *G06T 7/248* (2017.01); *G06T 7/74* (2017.01); *H04N 5/232* (2013.01); *G06T 2207/30221* (2013.01); *G06T 2207/30241* (2013.01)

(58) Field of Classification Search
CPC .. G08G 1/166; G08G 1/096783; A61B 5/163; A61B 5/18; A61B 5/746; G06T 2207/10028; G06T 2207/10044; G06T 2207/30242; G06T 2207/30252; G06T 7/70; G06T 2207/30221; G06T 2207/30241; G06T 7/248; G06T 7/74; G06T 7/75; G08C 17/02; G08C 2201/93; H04N 5/232
See application file for complete search history.

(56) References Cited

U.S. PATENT DOCUMENTS

| | | | | |
|---|---|---|---|---|
| 4,545,576 | A | * | 10/1985 | Harris ............... A63B 69/00 340/323 R |
| 5,138,322 | A | * | 8/1992 | Nuttall ............. A63B 71/0605 342/126 |

(Continued)

FOREIGN PATENT DOCUMENTS

| | | | |
|---|---|---|---|
| JP | 2006-293835 A | | 10/2006 |
| JP | 2006293835 A | * | 10/2006 |
| WO | WO2017/032977 A1 | * | 3/2017 .......... G01S 13/867 |

OTHER PUBLICATIONS

JP Office Action dated Aug. 20, 2019 as received in Application No. 2018-187111 (English Translation).

*Primary Examiner* — Bernarr E Gregory
(74) *Attorney, Agent, or Firm* — Maschoff Brennan

(57) ABSTRACT

A method including detecting an object within a field of view of a radar using a radar signal; tracking movement of the object through the field of view of the radar; triggering a camera to capture a plurality of images of the object based on the movement of the object; detecting the object in the plurality of images; combining data of the radar signal with data of the camera to estimate a position of the object; identifying a radar signal track generated by the motion of the object based on the combined data; and estimating a trajectory of the object based on identifying the radar signal track.

20 Claims, 8 Drawing Sheets

(51) Int. Cl.
  *G01S 13/58* (2006.01)
  *G06K 9/00* (2006.01)
  *G06T 7/254* (2017.01)
  *G06T 7/277* (2017.01)
  *G01S 13/00* (2006.01)

(56) References Cited

U.S. PATENT DOCUMENTS

| | | | | |
|---|---|---|---|---|
| 7,324,663 B2* | 1/2008 | Kiraly | ............... | A63B 24/0021 348/169 |
| 8,009,081 B2* | 8/2011 | Hong | ............... | G01S 13/867 342/52 |
| 8,049,658 B1* | 11/2011 | Lagonik | ............... | G01S 13/867 342/52 |
| 9,406,145 B2* | 8/2016 | Gammenthaler | ...... | G01S 13/867 |
| 9,955,126 B2* | 4/2018 | Yeo | ............... | G01S 13/867 |
| 10,145,951 B2* | 12/2018 | Izzat | ............... | G01S 13/867 |
| 10,634,778 B2* | 4/2020 | Liu | ............... | G01S 13/867 |
| 2004/0239509 A1* | 12/2004 | Kisacanin | ............ | G01S 13/867 340/575 |
| 2008/0191926 A1* | 8/2008 | Benayahu | ............. | G01S 13/867 342/52 |
| 2011/0102237 A1* | 5/2011 | Hong | ............... | G01S 13/867 342/55 |
| 2016/0306036 A1* | 10/2016 | Johnson | ............... | G01S 13/867 |
| 2016/0307335 A1* | 10/2016 | Perry | ............... | G06T 7/292 |
| 2016/0320476 A1* | 11/2016 | Johnson | ............... | G01S 13/867 |
| 2017/0054950 A1* | 2/2017 | Yeo | ............... | H04N 7/188 |
| 2018/0156914 A1 | 6/2018 | Tuxen et al. | | |

\* cited by examiner

RADAR AND CAMERA-BASED DATA FUSION

FIELD

The embodiments discussed herein are related to analyzing the trajectory of moving objects.

BACKGROUND

In some cases, it may be desirable to analyze various characteristics of a moving object. In one example, the desire to analyze the movement of the object may be related to participating in a sport where the moving object may be part of the sport itself, such as a baseball, golf ball, tennis ball, hockey puck, cricket ball, ammunition for skeet or target shooting, and the like.

Some potential problems with analyzing the trajectory of a moving object, however, include the processing cost and difficulty of obtaining and analyzing data. The cost for the equipment, both to obtain the data, as well as to process the data, may prove cost-prohibitive for individuals desiring a way to analyze the characteristics of the moving objects.

The subject matter claimed herein is not limited to embodiments that solve any disadvantages or that operate only in environments such as those described above; rather, this background is only provide to illustrate one example technology area where some embodiments described herein may be practiced.

SUMMARY

One embodiment of the present disclosure may include a method including detecting an object within a field of view of a radar using a radar signal; tracking movement of the object through the field of view of the radar; triggering a camera to capture a plurality of images of the object based on the movement of the object; detecting the object in the plurality of images; combining data of the radar signal with data of the camera to estimate a position of the object; and estimating a trajectory of the object based on combining the radar track with camera images.

Another embodiment of the present disclosure may include a system including a processor communicatively coupled to a radar device, a camera and memory, configured to read instructions stored on the memory causing the processor to detect an object within a field of view of a radar using a radar signal; track movement of the object through the field of view of the radar; trigger a camera to capture a plurality of images of the object based on the movement of the object; detect the object in the plurality of images; combining data of the radar signal with data of the camera to estimate a position of the object; identify a radar signal track generated by the motion of the object based on the combined data; and estimate a trajectory of the object based on identifying the radar signal track.

Another embodiment of the present disclosure may include a non-transitory computer-readable medium storing computer-executable code, the code executable by a processor to cause a system to detect an object within a field of view of a radar using a radar signal; track movement of the object through the field of view of the radar; trigger a camera to capture a plurality of images of the object based on the movement of the object; detect the object in the plurality of images; combining data of the radar signal with data of the camera to estimate a position of the object; identify a radar signal track generated by the motion of the object based on the combined data; and estimate a trajectory of the object based on identifying the radar signal track. The object and advantages of the embodiments will be realized and achieved at least by the elements, features, and combinations particularly pointed out in the claims. It is to be understood that both the foregoing summary and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to determining characteristics of a moving object using a radar device and a camera system. By capturing high speed imaging data (e.g., obtained by a camera) and radar-based data simultaneously, the captured data may be fused together and analyzed to determine an accurate reconstruction of the trajectory of a moving object. Using the captured data, trajectory and other motion characteristics of the moving object may be reconstructed and/or extrapolated. For example, the captured data obtained may include speed, velocity, rotation, axis of rotation, speed of rotation, vertical angle of elevation, azimuth angle, trajectory, release angle, etc. The motion characteristics may be used to further characterize the path of the moving object for later analysis. For example, if the moving object is a baseball, the flight characteristics may be used to characterize the type of pitch (e.g., a fastball, curveball, slider, or breaking ball) or location of pitch (e.g., strike or ball), and a sportsman may be able to adjust his or her pitching or batting strategies based on the analysis.

In another embodiment, radar data may be unavailable or unusable (e.g., due to the angle of the motion of the object), and thus the method may include reconstructing three-dimensional trajectory data without using the radar data.

Rather than solving a routine problem using routine computer algorithms, some embodiments of the present disclosure may relate to using particular hardware components, such as radar devices and cameras controlled by one or more processors, and techniques to address specific problems associated with analyzing moving objects, such as baseballs, tennis balls, golf balls, cricket balls, etc. In addition, the methods and systems described herein may be used in conjunction with artificial intelligence and/or computer learning to improve the execution of the methods described and the processing speed and efficiency of the systems described.

Figure 1:
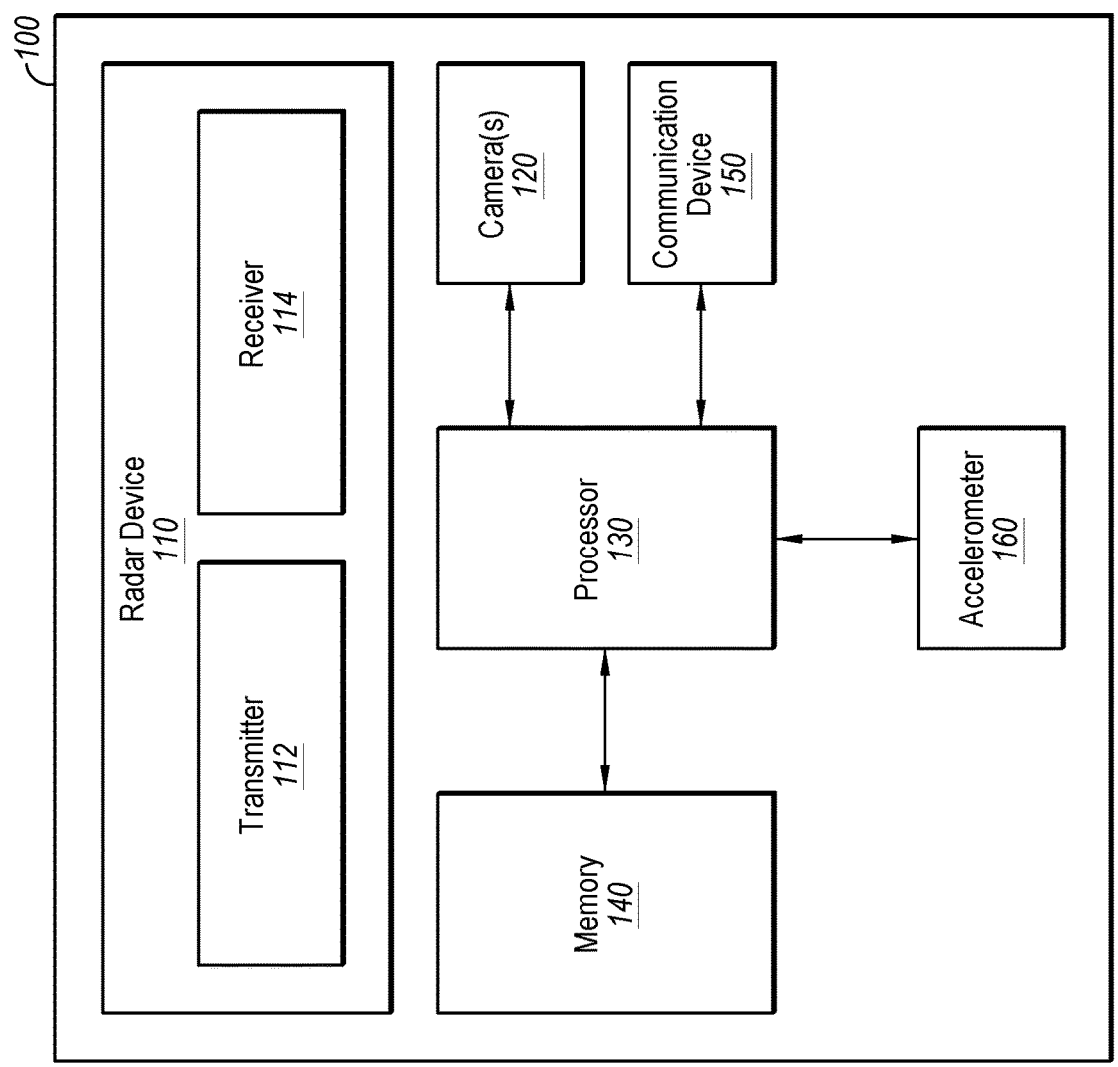
FIG. 1 illustrates an example system for radar and camera-based data fusion, in accordance with one embodiment.

FIG. 1 illustrates an example system 100 for radar and camera-based data fusion, in accordance with one embodiment. The system 100 may include a radar device 110, a camera 120, a processor 130, a memory 140, a communication device 150, and an accelerometer 160. The operation of the system 100 may be controlled by the processor 130, and the processor 130 may be in communication with each of the other components of the system 100. The components of the system 100 may work cooperatively using one or both of radar readings from the radar device 110 and images captured by the camera 120 to analyze characteristics of a moving object. While all components of the system 100 are illustrated in communication with the processor 130 but not depicted as being in communication with each other, any of the other components may also be in communication with each other; for example, the radar device 110 may be in communication with the camera 120 and the camera 120 may be in communication with the memory 140 and the communication device 150, etc. Additionally, while the system 100 is illustrated as a unitary device, one or more of the components may be distributed or may span across multiple devices.

The radar device 110 may include any system, component, or series of components configured to transmit one or more microwaves or other electromagnetic waves towards a moving object and receive a reflection of the transmitted microwaves back, reflected off of the moving object. The radar device 110 may include a transmitter 112 and a receiver 114. The transmitter 112 may transmit a microwave through an antenna towards the moving object. The receiver 114 may receive the microwave reflected back from the moving object. The radar device 110 may operate based on techniques of Pulsed Doppler, Continuous Wave Doppler, Frequency Shift Keying Radar, Frequency Modulated Continuous Wave Radar, or other radar techniques as known in the art. The frequency shift of the reflected microwave may be measured to derive a radial velocity of the moving object, or in other words, to measure the speed at which the moving object is traveling towards the radar device 110. The radial velocity may be used to estimate the speed of the moving object.

The radar device 110 may also include any of a variety of signal processing or conditioning components; for example, the radar device 110 may include an analog front end amplifier and/or filters to increase the signal-to-noise ratio (SNR) by amplifying and/or filtering out high frequencies or low frequencies, depending on the moving object and the context in which the radar device 110 is being used. In some embodiments, the signal processing or conditioning components may separate out low and high frequencies and may amplify and/or filter the high frequencies separately and independently from the low frequencies. In some embodiments, the range of motion of the object may be a few meters to tens of meters, and thus, the radar bandwidth may be narrow.

The radar device 110 may initially detect the object of interest when the object is within the field of view of the radar or when the object initially enters the field of view of the radar. In some embodiments, the radar signal is tracked for a pre-determined duration of time. At some triggering point during the pre-determined duration of time, the camera 120 is triggered to begin taking photographs.

The camera 120 of the system 100 may include any device, system, component, or collection of components configured to capture images. Although one camera 120 is illustrated with reference to FIG. 1, any number of cameras may be contemplated. The camera 120 may include optical elements such as, for example, lenses, filters, holograms, splitters, etc., and an image sensor upon which an image may be recorded. Such an image sensor may include any device that converts an image represented by incident light into an electronic signal. The image sensor may include a plurality of pixel elements, which may be arranged in a pixel array (e.g., a grid of pixel elements); for example, the image sensor may comprise a charge-coupled device (CCD) or complementary metal-oxide-semiconductor (CMOS) image sensor. The pixel array may include a two-dimensional array with an aspect ratio of 1:1, 4:3, 5:4, 3:2, 16:9, 10:7, 6:5, 9:4, 17:6, etc., or any other ratio. The image sensor may be optically aligned with various optical elements that focus light onto the pixel array, for example, a lens. Any number of pixels may be included such as, for example, eight megapixels, 15 megapixels, 20 megapixels, 50 megapixels, 100 megapixels, 200 megapixels, 600 megapixels, 1000 megapixels, etc.

The camera 120 may operate at certain frame-rates, or be able to capture a certain number of images in a given time. The camera 120 may operate at a frame rate of greater than or equal to about 30 frames per second. In a specific example, camera 120 may operate at a frame rate between about 100 and about 300 frames per second. In some embodiments, a smaller subset of the available pixels in the pixel array may be used to allow for the camera 120 to operate at a higher frame rate; for example, if the moving object is known or estimated to be located in a certain quadrant, region, or space of the pixel array, only that quadrant, region, or space may be used in capturing the image allowing for a faster refresh rate to capture another image. Using less than the entire pixel array may allow for the use of less-expensive cameras while still enjoying a higher effective frame rate.

Various other components may also be included in the camera 120. Such components may include one or more illuminating features such as a flash or other light source, a light diffuser, or other components for illuminating an object. In some embodiments, the illuminating features may be configured to illuminate the moving object when it is proximate the image sensor, for example, when the moving object is within three meters of the image sensor.

Any number of a variety of triggers may be used to cause the camera 120 to capture one or more images of the moving object. By way of non-limiting examples, the camera may be triggered when the moving object is known or estimated to be in the field of view of the camera 120, when a moving object first begins or modifies its flight (for example when a baseball is pitched, when a baseball is batted, when a golf ball is struck, when a tennis ball is served, when a cricket ball is bowled, etc.), when a moving object is detected at a leading row of pixels in the pixel array, etc. Another example of a trigger may be a persisting peak in a spectrum of reflected microwaves. For example, if there is consistently a peak at a given frequency known to be in an expected moving object frequency for a given duration of time, this may act as a triggering event.

In some embodiments, the camera 120 may have a field of view in which images may be captured. The field of view may correspond to the pixel array. In some embodiments, the field of view may be limited such that the moving object only spends a limited amount of time within the field of view. In such embodiments, the camera 120 may be triggered to capture images while the moving object is within the field of view. The time in which the moving object is within the field of view of the camera 120 may be referred to as an optimal photograph timeframe. In some embodiments, the optimal photograph timeframe may include when only the entire moving object is within the field of view or may include when only a portion of the moving object is within the field of view. Other factors may also contribute to the optimal photograph timeframe, such as the distance between the image sensor and the moving object, the amount of illumination that may be provided by an illuminating feature, etc. For example, the optimal photograph timeframe may occur when the moving object is traveling between three meters and one meter away from the camera 120 as that may be where a flash of the camera 120 provides illumination of the moving object.

In some embodiments, the field of view of the camera and the radar may be the same or may be different. In the case where the fields of view of the camera and the radar are different, a trigger mechanism may operate to ensure that the moving object remains in the field of view of the camera for as long as photographs are being captured.

The processor 130 may include any suitable special-purpose or general-purpose computer, computing entity, or processing device including various computer hardware or software modules and may be configured to execute instructions stored on any applicable computer-readable storage media; for example, the processor 130 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, the processor 130 may include any number of processors configured to perform, individually or collectively, any number of operations described in the present disclosure. Additionally, one or more of the processors may be present on one or more different electronic devices, such as different devices physically coupled together or communicating remotely. By way of example, one or more of the processors being in different devices may include a processing sub-component associated with one or more of the radar device 110, the camera 120, the communication device 150, the accelerometer, or any other device coupled to or associated with the system 100, working with a processor in another device such as a remote display device or a remote computing device configured to perform one or more of the operations described in the present disclosure.

In some embodiments, the processor 130 may interpret and/or execute program instructions and/or process data stored in the memory 140. In some embodiments, the processor 130 may fetch program instructions from a data storage and load the program instructions in the memory 140. After the program instructions are loaded into memory 140, the processor 130 may execute the program instructions. In some embodiments, the execution of instructions by the processor 130 may direct and/or control the operation of the device 100. For example, the processor 130 may instruct the camera 120 to capture images at certain times, for example, during the optimal photograph timeframe.

In some embodiments, the processor 130 may use the received microwave signal from the radar device 110 to determine the radial velocity of the moving object. The processor 130 may perform spectral measurement on the Doppler signal to determine whether there is a moving object; for example, using the example of a pitched baseball, the spectral measurements may be used to determine if there is an object reflecting the microwaves travelling between forty and one hundred miles per hour. The spectral measurements may include performing a Fast Fourier Transform (FFT) to determine whether any of the frequency peaks cross a particular threshold. The processor 130 may then use that peak to determine the radial velocity of the moving object.

The processor 130 may use the determined radial velocity as one factor to trigger the camera 120 to capture images of the moving object. In one example, a flight path distance and/or trajectory may be estimated between an initial point of the moving object and the system 100. In some embodiments, the flight path distance may be estimated as the distance between the initial point of the moving object and the field of view of the camera 120; for example, if the moving object is a baseball, the estimated flight path distance may be the distance between the pitcher's mound and home plate. The processor 130 may then determine the amount of time required for the moving object to traverse the flight path distance and arrive at the field of view of the camera 120 or until the optimal photograph timeframe. The processor 130 may also account for any time required for the camera 120 to actually capture the image.

In some embodiments, the processor 130 may determine the number of images to be captured. The number of images to be captured may be based on an input from a user, a default setting, the context of the moving object, or selected based on the field of view of the camera 120 and the speed of the moving object. A larger number of images may allow for a more accurate extrapolation of flight characteristics, such as the trajectory. In some embodiments, an example default setting may include capturing two, three, or four images. The processor 130 may be configured to trigger the camera 120 to capture images of the moving object during a pre-determined photograph timeframe such that the desired number of images may be captured during the pre-determined photograph timeframe; for example, the processor 130 may determine that two images are desired and may wait until the entire moving object is in the field of view and may then trigger the camera 120 to capture two successive images as quickly as possible with the camera 120 with the first image only using one quadrant of the image sensor of the camera 120 and the second image only using a different quadrant of the image sensor of the camera 120.

The processor 130 may be configured to perform processing of the captured images or may use the communication device 150 to transmit the images to another device to perform processing of the captured images. Processing of the captured images may include extrapolating flight characteristics of the moving object; for example, the processor 130 may determine speed, velocity, rotation, axis of rotation, speed of rotation, vertical angle of elevation, azimuth angle, trajectory, release angle, etc.

In some embodiments, the processor 130 may perform other characterizations of the moving object based on one or more of the flight characteristics. Using a pitched baseball as an example, the processor 130 may use the trajectory to determine whether the pitch is a ball or a strike. As another example, the pitch may be characterized as a fastball, breaking ball, slider, etc. based on the speed, rotation, trajectory, etc. of the baseball.

The processor 130 may compare the extrapolated flight characteristics to the data collected from the radar device 110; for example, an extrapolated trajectory may be compared to the actual radar values measured at one or more points in time. If there is a discrepancy between the radar values and the extrapolated trajectory, the processor 130 may include one or more environmental factors or atmospheric conditions to account for the discrepancy, such as humidity, wind, rain, etc. Additionally or alternatively, the processor 130 may verify the image quality of the captured images used to extrapolate the flight characteristics; for example, if any of the captured images are particularly fuzzy or grainy, the processor 130 may modify the extrapolated flight characteristics to conform more closely to the measured values from the radar device 110. Other operations of the processor 130 with respect to the system 100 may be described with further reference to other figures in the present disclosure, described below.

The memory 140 may include computer-readable storage media for carrying or having computer-executable instructions or data structures stored thereon, including one or more of the images captured by the camera 120. Such computer-readable storage media may include any available media that may be accessed by a general-purpose or special-purpose computer, such as the processor 130. By way of example, and not limitation, such computer-readable storage media may include tangible or non-transitory computer-readable storage media including random access memory (RAM), read-only memory (ROM), electrically erasable programmable read-only memory (EEPROM), compact disk-read-only memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 130 to perform a certain operation or group of operations. In some embodiments, memory 140, while depicted as a single component, may be multiple components. For example, memory 140 may be implemented as a combination of RAM, ROM, and flash memory.

The communication device 150 may be any component, device, or combination thereof configured to transmit or receive data. The communication device 150 may include, without limitation, a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication device 120 may permit data to be exchanged with a network (such as, either alone or in any suitable combination, the Internet, an Intranet, a local Wi-Fi network, a wireless Local Area Network (LAN), a mobile network (e.g., a 3G, 4G, 5G, and/or LTE network), a LAN, a Wide Area Network (WAN), a MAN, a Bluetooth connection, or any other suitable communication network) and/or any other devices described herein, including remote devices.

The accelerometer 160 may measure an angle of the system 100 for use by the radar device 110 and/or the camera 120 to provide correct planar information for planar equalization. The accelerometer, for example, may be used to calibrate the camera and to ensure that the camera may tilt and roll with a pre-determined accuracy. In some embodiments, the use of the accelerometer may be used to calibrate the camera in such a way to enable the conversion of camera measurements to world coordinates (e.g., spherical or Cartesian coordinates). In addition, the accelerometer may be used to align the camera data with the radar data.

Modifications, additions, or omissions may be made to the system 100 without departing from the scope of the present disclosure; for example, in some embodiments, the system 100 may include any number of other components that may not be explicitly illustrated or described; for example, the system 100 may not include the communication device 150 and may perform all image processing locally at the system 100. The system 100 may also include a display for displaying any of the flight characteristics or other characterizations performed by the system 100.

Figure 2:
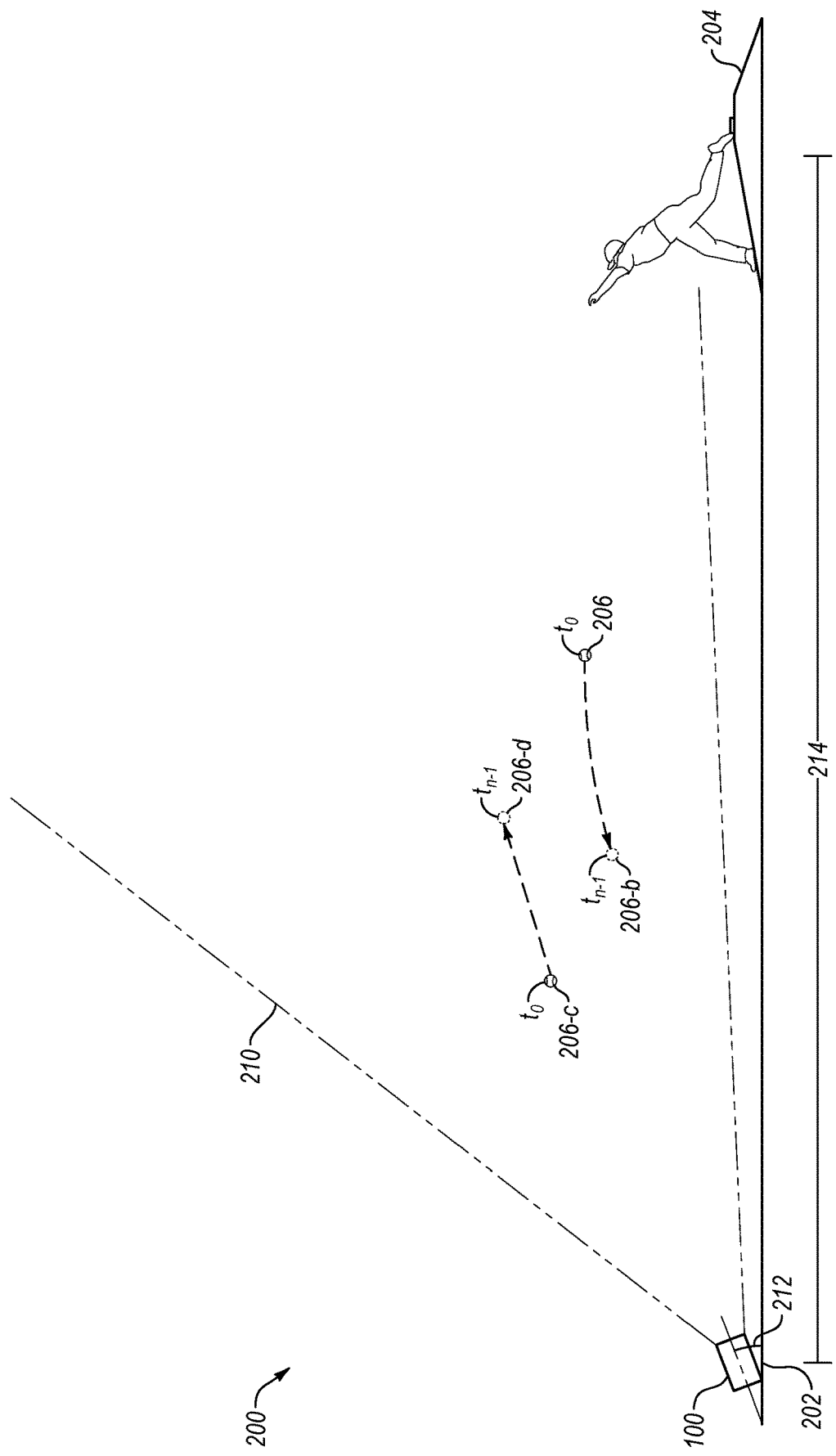
FIG. 2 illustrates an elevation view of an example system for analyzing a moving object, in accordance with one embodiment.

FIG. 2 illustrates an elevation view of an example environment 200 for radar and camera-based data fusion, in accordance with one embodiment. For purposes of clarity and brevity, the remaining portion of the detailed disclosure uses as an example of the moving object a baseball 206, where the example environment is a baseball diamond. In FIG. 2, the placement of the system device 100 may be positioned at home plate, with a pitcher standing at location 204. In FIG. 2, the system 100 may be representative of system 100 described with respect to FIG. 1. It should be understood, however, that any moving object may be contemplated and that present disclosure is applicable to any other moving object, for example, other sporting paraphernalia such as a tennis ball, a golf ball, a hockey puck, a cricket ball, etc.

The system 100 may be located in any of a variety of locations such that the radar device 110 and the camera may have the moving object in the field of view 210 for a length of time sufficient to capture a plurality of images with the camera. In one embodiment, the system 100 is located a known distance 214 from a reference point (such as pitching mound 204). In some embodiments, the system 100 may be located on or near the ground at home plate 202 and angled upwards degrees (as illustrated by angle 212). In some embodiments, the system 100 may be elevated a certain height (not illustrated in FIG. 2) behind the home plate 202 and angled downward. In other embodiments, the system 100 may be to one side of the home plate 202 and angled towards the pitching mound 204. The system 100 may be located in any of a variety of locations such that the radar device 110 and the one or more cameras may have the moving object in the field of view 210 for a length of time sufficient to capture a plurality of images with the camera.

In one example embodiment, the baseball 206 may be pitched from a pitching mound 204, and be moving along a path 208 starting at time to and where the baseball may be may be at time $t_{N-1}$ (now illustrated by dotted line 206-b). Baseball 206 may be considered an "incoming object" with respect to system 100 in this example. In another example, the baseball 206-c may be hit by the batter located at home plate 202 moving along a path 218 illustrated between baseball 206-c at time to and at time $t_{N-1}$ (now illustrated by dotted line 206-d). Baseball 206-c may be considered an "outgoing object" with respect to system 100 in this example.

Figure 3:
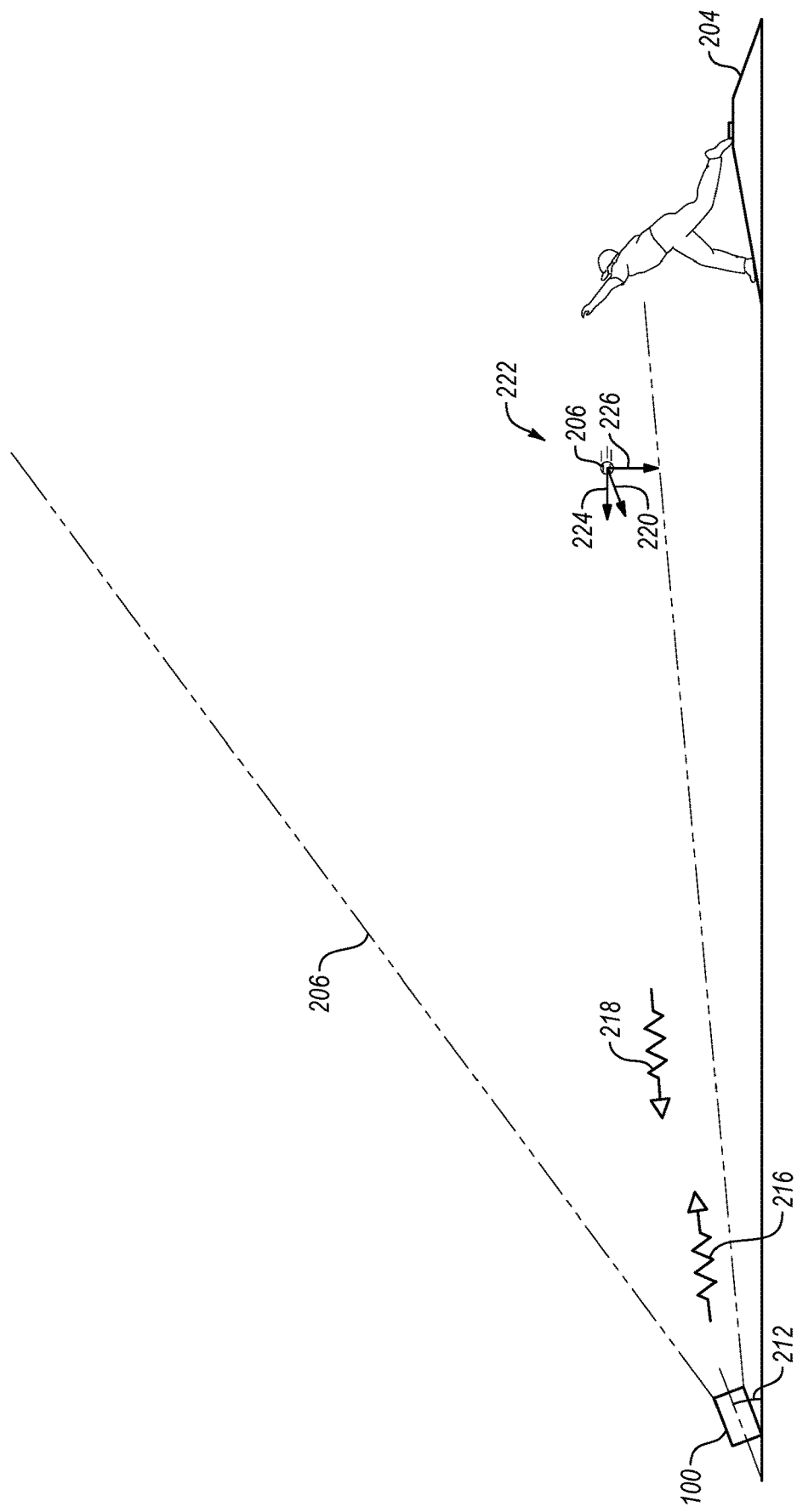
FIG. 3 illustrates an elevation view of an example environment for radar and camera-based data fusion, in accordance with one embodiment.

FIG. 3 illustrates an elevation view of an example environment for radar and camera-based data fusion, in accordance with one embodiment. Baseball 206 may be pitched from pitching mound 204 towards home plate and also the system 100. The system 100 may be positioned at an angle 212 to increase a field of view 206 of a camera of the system 100. In some embodiments, the radar device and the camera of the system 100 may be tilted to the same plane. Angling the radar device and the camera to the same plane may facilitate easier manufacturing. In some embodiments, the radar device and the camera of the system 100 may be tilted to different planes.

When the baseball 206 is pitched, the system 100 may transmit microwaves towards the baseball 100. In some embodiments, the system 100 may already be transmitting microwaves 216 in all directions with spatial distribution described by an antenna beam pattern of a radar device of the system 100. The transmitted microwave 216 may be reflected off of the baseball 206 and because of the relative velocity of the baseball 206, the reflected microwave 218 may have a different frequency than the transmitted microwave 216. The frequency drift may be referred to as Doppler frequency and may be a factor of the radial velocity 220.

The radar device 110 of the system 100 may facilitate the determination of the radial velocity 220 of the baseball 206; for example, a vector diagram 222 may show a radial velocity 220 of the baseball 206. The baseball 206 may have component vectors 224 and 226 contributing to the radial velocity 220. In some embodiments, if the distance between the moving object (e.g., the baseball 206) is much larger than the distance above the ground of the moving object (e.g., the height of the baseball 206 above the ground), the radial velocity 220 may be estimated to be the same as the horizontal velocity 224 of the moving object. Stated another way, if the vertical velocity 226 of the radial velocity 220 is much smaller than the horizontal velocity 224, the radial velocity 220 may be estimated to be the same as the horizontal velocity 224. One example of the horizontal velocity 224 being much larger than the vertical velocity 226 may be if the horizontal velocity 224 is an order of magnitude larger than the vertical velocity 226.

Tracking a Regularly Shaped Object

Figure 4:
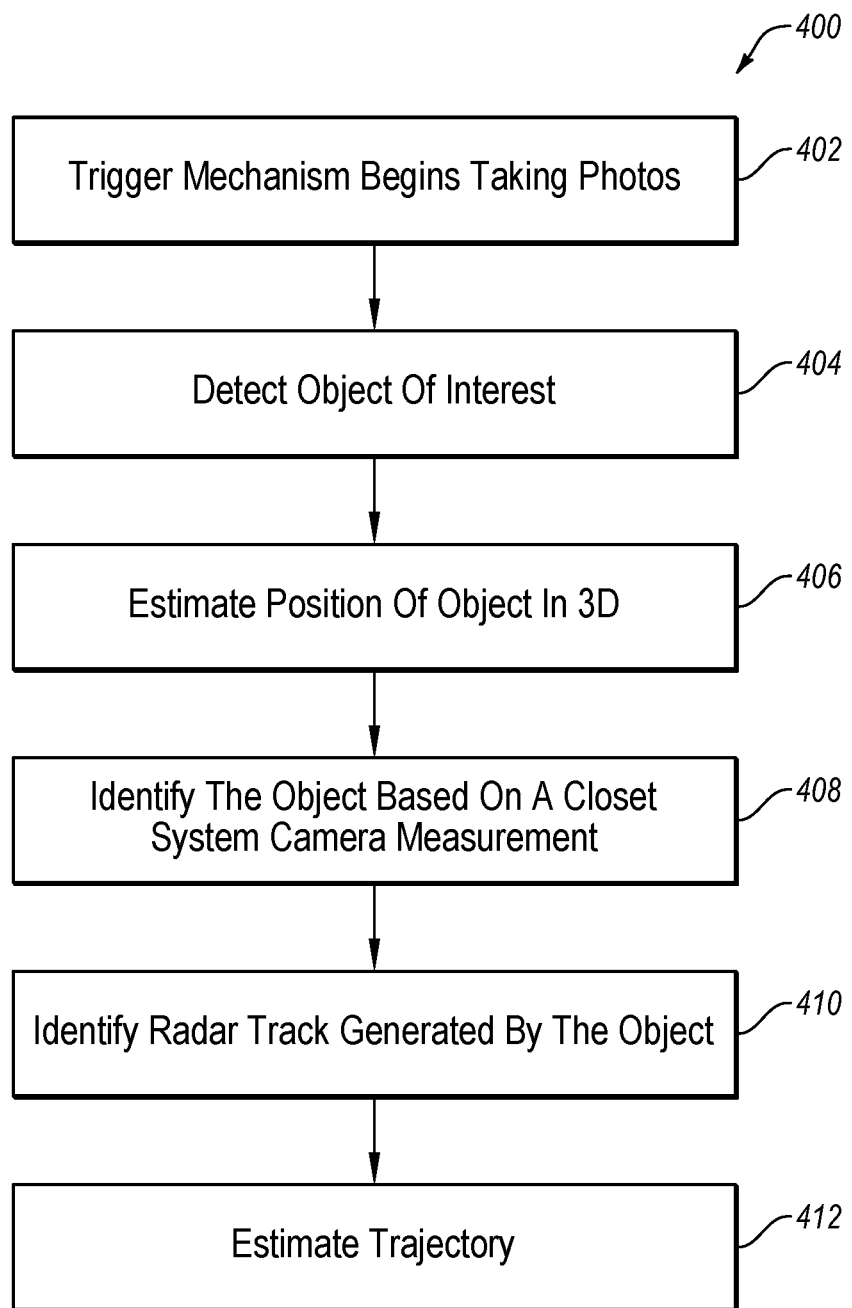
FIG. 4 illustrates a flowchart of an example processing method for radar and camera-based data fusion, in accordance with one embodiment.

FIG. 4 illustrates a flowchart of an example processing methodology for radar and camera-based data fusion, in accordance with one embodiment. At block 402, an object may be detected within a field of view of radar device 100, which may trigger the camera to being taking photos of the object. When pre-determined tracking conditions are satisfied, the camera is triggered to begin taking photographs. In one example, the trigger to begin taking photographs is that a pitched ball appears field of view of the radar. Simultaneously, the motion of the hand pitching the ball may be detected, and thus, the motion of the ball may be tracked both as an incoming object and an outgoing object. In an additional or alternative example, the trigger to begin taking photographs may be identifying the motion of a ball when hit from off-a-tee. In this example, the radar signal from swinging of the hand is detected and as a result triggers the camera.

In an addition or alternative example, the trigger to begin taking photographs may be detection of the hand swing. For example, the system 100 may be placed on a tripod in such a way that the hands of a user swinging, e.g., a bat or a golf club, are visible. The swing of the hands can be tracked and the camera can be triggered to begin taking photographs. In an additional or alternative example, the swing of the hands may be tracked, and the swing data may be correlated with a pre-defined mask until a threshold parameter is met (e.g., amplitude, speed, etc.). The correlation signal may also be a time-domain reference signal.

In some embodiments, when the camera is triggered to begin taking photographs, the system may take N photographs, where N may be pre-determined by a user, calculated by the system based on previous rounds of photography, determined by a manufacture, and/or determined by any number of conditions which may alter the number of photos taken.

Based on the trigger mechanism, the N images are taken at time $t_0, t_1, \ldots t_{N-1}$, with a sampling interval of dt, such that $$t_n = t_{n-1} + dt \quad (1)$$

where $n \in \{0, \ldots, N-1\}$.

It is not necessary that the images be taken at a periodic interval of dt, and the images may be taken at any time interval such as an aperiodical time interval. Regardless of the time interval, the total time duration of the images taken, $DT = t_{N-1} - t_0$, should be selected in such a way that the fastest expected object remains in the field of view of the camera.

The lower bound on dt may be determined by practical imitations, such as the camera shutter speed and/or hardware limitations. The camera, however, should be a high speed camera with a frame rate greater than 60 frames per second in order to capture enough images of the moving object while the moving object is still in the field of view of the camera. Image processing algorithms, as described here, may be applied to these images to extract the position information of the moving object at each time $t_1$. The position of the moving object at each time sample may be stored in a matrix $P^C$ containing vectors $P_n^C$ as the columns, as in the following manner:

$$P^C := [P_0^C \ldots P_n^C \ldots P_{N-1}^C], n \in \{0, \ldots, N-1\} \quad (2)$$

where $P_0^C := [x_n \ y_n \ z_n]^T$.

After the trigger mechanism activates, initiating the photography, at block 404 the system operates to detect the object (e.g., the baseball or generally a moving object) in the photographs taken during block 402. In some cases, if the system operates using a single camera, it may be useful to have previously knowledge about the shape and size of the object; for example, that the object is a baseball as opposed to a golf ball or a football, having an approximate diameter of 2.5 inches. In some cases, if the system operates using multiple cameras (e.g., a stereo camera system), knowing the shape and size of the object of interest beforehand may not be needed, but may speed up processing if the data can be provided to the system ahead of time.

In some embodiments, the system 100 has prior knowledge, based on the motion-based trigger mechanism, that the object is or will be in motion with respect to a static background (e.g., the motion of a hit ball across a static baseball field environment). Thus, in one example, detecting the object of interest may be done by using the first photograph of a series of captured photographs as a background image, and then subtracting images from each subsequent photograph from the initial background photograph. The subtraction operation may be followed by a thresholding and/or applying a filter to remove noise and thus detect the object against the background.

In another embodiment, detecting the object in the photographs may be enabled by first selecting a photograph from the series of photograms as the "starting" image. Subsequently, images from the photograph are subtracted from photographs occurring before the "starting" photograph and photographs occurring after the "starting" photograph. The different photographs are multiplied to highlight the portions of the photographs that are common to both the before and after images. The result of this multiplication further highlights the region of interest inside each photograph where the moving object can be found. If the object has well-defined characteristics (e.g., a circular shape, an oval shape, etc.), then the system 100 can use pattern-matching using pre-known patterns, to determine the object in the images.

In another embodiment, detecting the object may further include using a Hough transform for objects that may be parameterized using known parameters; for example, a circle has three parameters (i.e., radius, and horizontal and vertical position of the circle's center); an ellipse has four parameters (i.e., the major axis, the minor axis, and horizontal and vertical positions of the ellipse's center). Once the object is detected as being present in the images, the parameters of interest may be stored in an array, with each entry having a time-stamp (e.g., using an internal clock of the system 100 or another timing device) that may aid in tracking the path of the object.

Once the object has been detected, at block 406, the system 100 estimates the position of the object in the three-dimensional space. The position of the object in three-dimensional space, for each photograph taken, is associated with a time $t_i$ for every $i^{th}$ photograph. Given the accurate position of the object at each time sample, and using interpolation, an accurate trajectory may be reconstructed for the duration of the observation time period (i.e., a pre-determined timeframe).

In some cases, the horizontal and vertical position of the object may be accurately determined, however, the camera observation for depth may not be as accurate. In terms of spherical coordinates, the range has a greater error as compared to the azimuth and elevation. The error in ranging may thus have an effect on the error in the position on all three dimensions which may lead to an error in finding the speed and direction in which the object is moving.

At block 408, the object may be identified based on the camera-based measurement that is closest to the system 100. In some cases, the object closest to the system 100 may be used because the error in ranging may be less than an object located farther from the system 100; the farther the object is located from the system, the range resolution may be exponentially worse.

At block 410, the system 100 may identify a radar track generated by the moving object using the camera-based measurements determined in the blocks above. The radar device 110 may generate a Doppler signal that corresponds to the radial velocity of the moving object, where the radial velocity may be used to correct for the trajectory.

In some embodiments, radar device 110 may capture data comprising two analog components: the in-phase component (or the I-Channel) and the quadrature component (or the Q-channel). When taken together, the in-phase component and the quadrature component form a complex signal s(t), where:

$$s(t)=I(t)+iQ(t), \qquad (3)$$

where i is equal to $\sqrt{-1}$. The in-phase component and the quadrature component are sampled using an analog-to-digital converter at a sampling frequency $F_s$. The components may be pre-filtered and amplified as needed before sampling. After sampling a high order Finite Impulse Response (FIR) digital filter is applied to each channel. In some embodiments, an Infinite Impulse Response Filter (IIR) may be applied to the sample instead of the FIR filter. In some cases, the filter removes low frequency motion generated by, for example, the motion of an individual (e.g., the pitcher or the batter, in this example), limb motion other than the motion of the limb of interest, and the like. At this point, the data may be in the time-domain, and using moving window N-point Fast Fourier Transform (FFT), the time-domain data is converted to time-frequency domain data. To generate a smooth spectrum with few artifacts of finite-duration windowing and reduced spectral leakage windowing functions such as Hamming, Blackman, Kaiser, and the like, may be applied to pre-multiply the time-domain data before taking FFT.

The raw data captured by the system may be captured in the camera coordinates system, but should be converted to the world coordinates system, where the world coordinates system may be spherical coordinates or Cartesian coordinates, for example. In order to convert the data to the world coordinate system, the camera position and orientation are used in order to construct a camera-to-world coordinates transformation matrix: $R_C^W$. The camera-to-world coordinate matrix may be a 4×4 matrix containing associated rotations and translations used to convert any vector from the camera into the selected world coordinate system. A vector in world coordinates may be obtained by the following equation:

$$S^W = R_C^W S^C \qquad (4)$$

where $S^W$ is the transformed vector into world coordinates, and $S^C:=[S_x S_y S_z 1]$ is a vector in camera coordinates. The vector is three-dimensional, however "1" may be appended as a $4^{th}$ dimension to cater for translations, as $R_C^W$ is 4×4.

For a regularly shaped object (e.g., baseball, golf ball), having a radius, $r_b$, the spherical coordinates in the camera frame of reference, $\rho_n, \theta_{n,and \phi_n}$, are given by $$\rho_n = \frac{r_b}{\theta_b} \qquad (5)$$

$$\theta_n = \frac{x_n^i}{\Theta_F} \qquad (6)$$

$$\phi_n = \frac{y_n^i}{\Theta_F} \qquad (7)$$

where $\theta_b$ is the angle subtended by the object, given by $$\theta_b = \frac{2r\Theta_F}{L},$$

where r is the radius of the object in pixel, L is the total length of the image, $\Theta_F$ is the field of view of the lens, $x_n^i$ and $y_n^i$ represent the raw image x and y pixel values of the center location of the $n^{th}$ object.

At step 412, the system 100 may estimate the trajectory of the moving object and calculate the parameters of interest from the estimated trajectory, where the parameters of interest may include speed, velocity, rotation, axis of rotation, speed of rotation, vertical angle of elevation, azimuth angle, trajectory, release angle, etc.

Multiple Object Tracking

Figure 5:
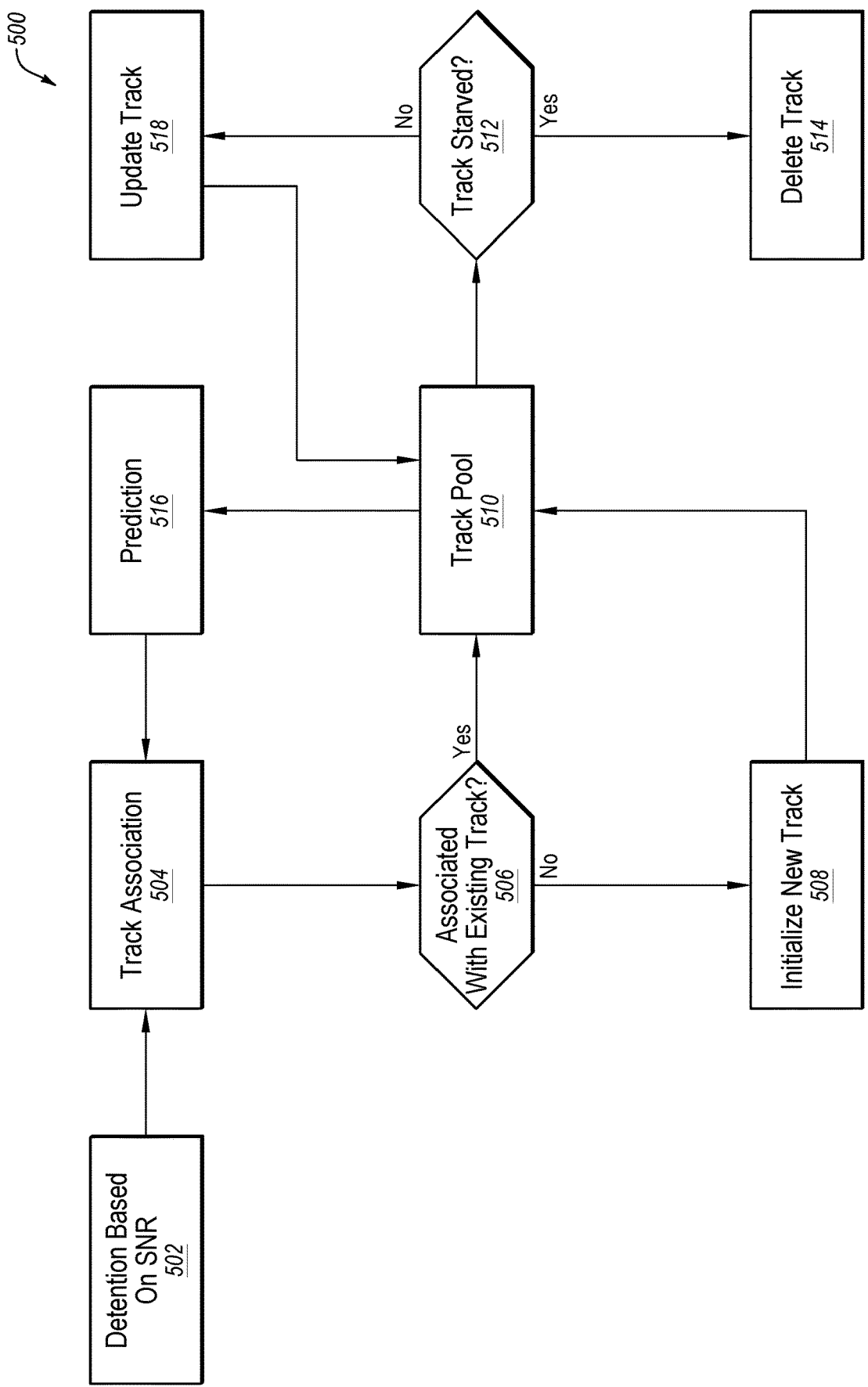
FIG. 5 illustrates a flowchart of an example processing method for radar and camera-based data fusion, in accordance with one embodiment.

FIG. 5 illustrates a flowchart of an example processing method 500 for radar and camera-based data fusion, in accordance with one embodiment. In some embodiments, more than one object may be tracked, either purposefully or because there may be multiple moving objects that the radar may detect (e.g., other balls, birds, planes, people in the field of view). In the case of multiple objects it may be difficult to track the correct objects; therefore, in one example, the radar used may be a narrow beam radar having a predefined beam-width. If the moving object is in the beam of the radar, the object will generate a Doppler frequency equivalent to the radial velocity. The objects tracked simultaneously may include, but are not limited to, the hand of the pitcher, the ball, the arm of the pitcher and/or the batter, the swing of a bat or golf club, and the like.

The detection may be based on calculating a signal-to-noise ratio (SNR), as shown in block 502. In block 504, the identified frequency or frequencies may be associated with existing pre-determined radar tracks stored in a radar track pool based on proximity. A determination if there is an association may be made in block 506. If not, as shown in block 508, then a new radar track is created (block 508) and placed in the radar track pool (block 510).

If an association with an existing track is determined to be so (block 506), then the pre-associated radar track is determined to be present in the radar track pool (block 510). At each iteration, the radar track data may be used to predict the next expected frequency detected (block 516). If the detection for a certain radar track fails for multiple iterations (e.g., the detection of one object among multiple objects, or distinguishing multiple objects from one another fails), then the radar track is starved (block 512), and subsequently the radar track is deleted from the radar track pool (block 514). On the other hand, if the radar track does not fail (e.g., an object is detected from a group of multiple objects, or multiple objects are distinguished from each other), then the radar track is updated (block 518) and entered into the radar track pool (510) for a later association.

In one embodiment, the following state-space tracker equation may be used for multiple object tracking:

$$x_n = Px_{n-1} + G(y - HPx_{n-1}) \quad (8)$$

where vector x is the state vector.

Vector x may be represented by:

$$x = \begin{matrix} x \\ \dot{x} \\ \ddot{x} \end{matrix} \quad (9)$$

The matrix G may be the gain matrix. A Kalman filter may be used to find G, or in an alternative, static values of α, β, and γ may be used to find G as follows:

$$\begin{matrix} \alpha & 0 & 0 \\ 0 & \beta & 0 \\ 0 & 0 & \gamma \end{matrix} \quad (10)$$

The matrix P may be the state-transition matrix as follows:

$$\begin{matrix} 1 & dt & dt^2 \\ 0 & 1 & dt \\ 0 & 0 & 1 \end{matrix} \quad (11)$$

where dt is the radar data sampling duration.

The matrix H may be the measurement matrix as follows:

$$\begin{matrix} 1 & 0 & 0 \\ 0 & 1 & 0 \\ 0 & 0 & 1 \end{matrix} \quad (12)$$

The radar track data may be fitted to equation (13) using a Least Squares fitting, as follows:

$$v(t) = \beta_0 + \beta_1 t + \beta_2 t^2 + \beta_3 t^3 \quad (13)$$

If the initial range is set as $\rho t_1$, then the range $\rho_{t1}$ at time $t_1$ may be found using the following equation:

$$\rho t_1 = \rho t_0 + \frac{1}{12}\lfloor -12\beta_0(t_0 - t_1) - \\ 6\beta_1 t_0^2 + 6\beta_1 t_1^2 - 4\beta_2 t_0^3 + 4\beta_2 t_1^3 - 3\beta_3 t_0^4 + 3\beta_3 t_1^4 \rfloor \quad (14)$$

Given the closest range of the object $\rho t_0$, equation (14) integrates a Doppler curve in order to find a range difference between $t_1$ and $t_0$. In one embodiment, it may be assumed that the maximum ranging error due to pixel resolution at range $\rho t_0$ is $d\rho$. Thus, the error at range $\rho t_1$ may be $d\rho + dv$ ($t_1 - t_0$). Due to cubic curve fitting, the error dv may be very small and the contributing factor for the error remains $d\rho$; the ranging error may therefore remain constant for the complete duration of the baseball flight as it is tracked by the radar.

Figure 6:
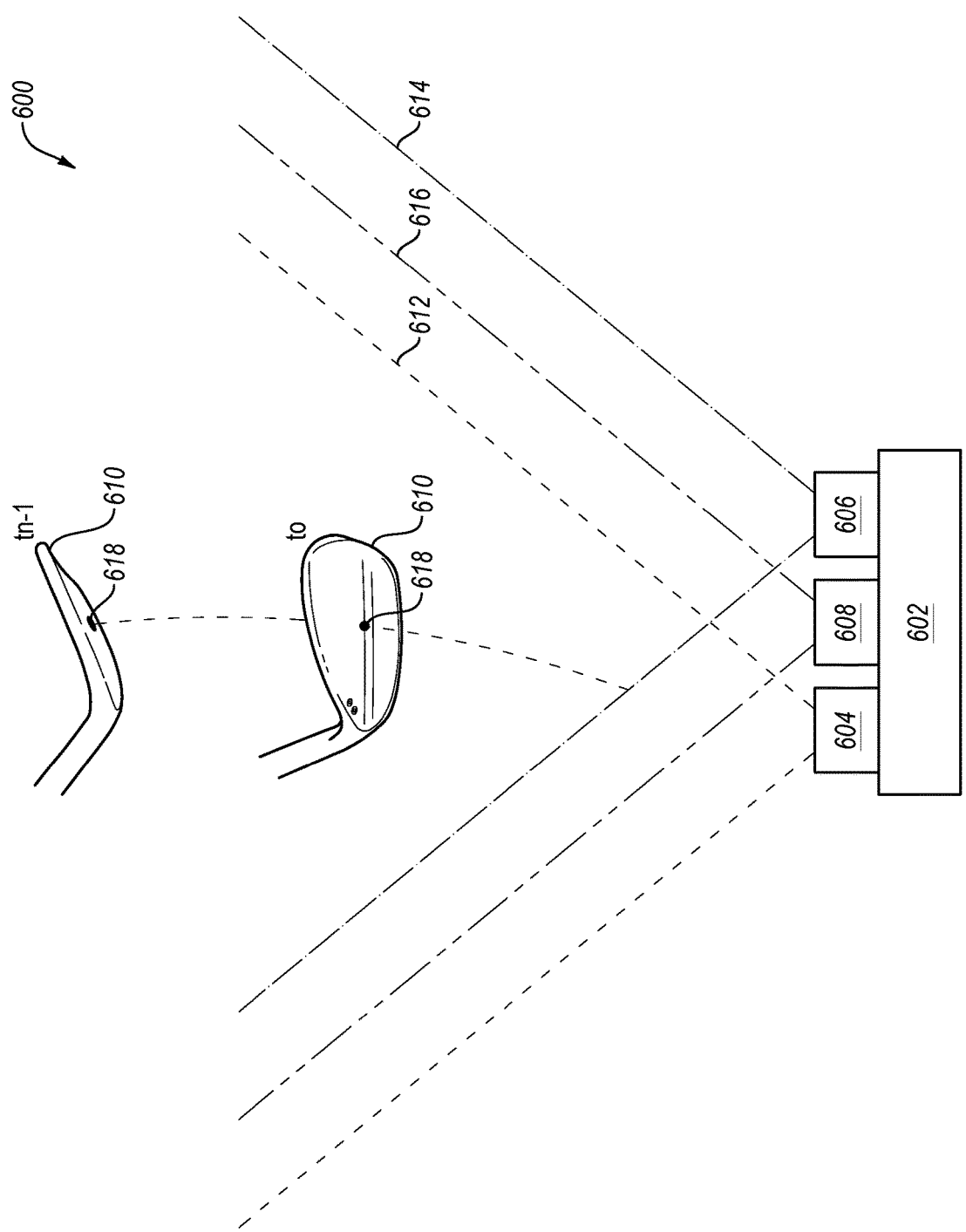
FIG. 6 illustrates an example view of an example environment for radar and camera-based data fusion, in accordance with one embodiment.

FIG. 6 illustrates an example view 600 of an example environment for radar and camera-based data fusion, in accordance with one embodiment. In one embodiment, the object may not be a sphere or an ellipsoid (or other predictably regular shape), but may instead be irregularly shaped, such as a golf club, which may present additional challenges since the shape and related shape-based parameters may not be pre-known.

The system 602 may include two cameras 604 and 606, as well as a radar unit 608. Cameras 604 and 606, and radar 608, may have fields of view 612, 614, and 616, respectively. In some embodiments, a point of interest P 618 may be, for example, the center of the club head, or some other protrusion that may be most likely to reflect more of the radar signal. The cameras 604 and 606 may be triggered to take images of the object 610 (e.g., a golf club head) in order to determine a point of interest P 618 located on the object 610 as described above; namely, when the point of interest P 618 enters the field of view 616 of the radar, the cameras 604 and 606 may be triggered to begin taking photographs. The three-dimensional coordinates of the point of interest P are determined. In the case where there are multiple radar reflections from different locations, such as the toe or heel of the club, an average value may be used.

When the coordinates of P 618 are determined, P 618 is then associated with the radar signal sent and received from radar unit 608. Point of interest P 618 then tracked over multiple photographs taken with stereo cameras 604 and 608 leading up until actual contact with a golf ball (or a baseball bat hitting a baseball, for example). For example, the coordinates of P 618 may be measured at time t0 and then again at time $t_{N-1}$, as the golf club is swung. In an alternative or additional embodiment, the coordinates of P 618 may be measured multiple times between time t0 and then again at time $t_{N-1}$. In one example, time $t_{N-1}$ may be the time the golf club 610 makes contact with a golf ball. At that point, the trajectory of the golf ball may be estimated using the methods described in this description, such as those methods described in conjunction with FIGS. 1-4.

In some cases, the range resolution may worsen as the object moves further away from cameras 704 and 706. In order to reduce the worsening of the range resolution, the time when the object is determined to be closest to the camera is selected as the starting time $\rho t_0$, with regard to equation (14). Equation (14) may then be used to obtain the range of the object for various other time samples, and the three-dimensional trajectory may be reconstructed with a similar level of accuracy as reconstructing the trajectory of a regularly shaped object as described previously.

Camera-Only Trajectory Estimation

In some embodiments, the object may be moving in a direction that is perpendicular or nearly perpendicular to the radar. In such as cause, the radial speed measured by the radar may be close to zero or otherwise very small; however, it is still possible to measure the radial speed of the object unless the Doppler speed is absolutely zero.

In practice, the Doppler speed is measured through detecting frequency corresponding to the radial speed of the object. There is motion around the object (e.g., motion of a pitcher, motion of a batter, motion of a bat, motion of other players, etc.), that may generate interference at low frequencies. It may be difficult to detect a moving object that generates a low Doppler frequency, thus, image processing may be used for estimating a trajectory of the moving object.

For a moving object having some speed, the initial trajectory may be assumed to have a mostly linear motion and be moving at a constant speed. The Doppler speed, however, depends on the position of the projectile and the direction of the motion. In one embodiment, the closest measurement of the moving object may be captured at time $t_0$. The range $\rho$, azimuth $\theta$, and elevation $\phi$ of the moving object may be found using equations (5), (6), and (7) discussed above with respect to FIG. 4.

The spherical coordinates (i.e., equations (5), (6), and (7)) may be transformed into Cartesian coordinates using the following equations:

$$x_n = \rho_k \cos \phi_n \cos \phi_n \quad (15)$$

$$y_n = \rho_k \sin \phi_n \quad (16)$$

$$x_n = \rho_k \cos \phi_n \sin \theta_n \quad (17)$$

The range $\rho_0$ may be calculated from imaging using equations (5), (6), and (7). The remaining ranges (i.e., $\rho_1, \ldots, \rho_n$) are calculated using equation (14) described previously. The azimuth $\theta$ and elevation $\phi$ may be calculated by finding the center of the moving object. The coefficients $\beta_0, \ldots, \beta_2$, are unknown without the benefit of radar data (i.e., unknown because the object may be perpendicular or near perpendicular to the radar measurements). Thus, the coefficients may be estimated using the following optimization equation, where min $\beta$:

$$\Sigma_{i=1}^{N}[\|v_i - v_{i-1}\|_2^2 (v_{x_1} - v_{x_{t-1}})^2 + (v_{y_1} - v_{y_{t-1}})^2 + (v_{z_1} - v_{z_{t-1}})^2] \quad (18)$$

and where:

$$\beta_{0_{min}} \leq \beta_0 \leq \beta_{0_{max}}$$

$$\beta_{1_{min}} \leq \beta_1 \leq \beta_{1_{max}}$$

$$\beta_{2_{min}} \leq \beta_2 \leq \beta_{2_{max}}$$

In one embodiment, solving equation (18) may be accomplished using a grid search for parameters $\beta_0$, $\beta_1$, and $\beta_2$. In another embodiment, a gradient descent algorithm may be used to determine the parameters.

Gradient Descent

In using a gradient descent to determine the parameters, the method finds the Jacobian matrix of the error function of equation (18) and the descend in the direction of the Jacobian until the optimum solution, $\beta^*$, is found. The error function is given by equation (18) (above) and reproduced below:

$$f(\beta) = \Sigma_{i=1}^{N}[\|v_i - v_{i-1}\|_2^2 + (v_{x_1} - v_{x_{t-1}})^2 + (v_{y_1} - v_{y_{t-1}})^2 + (v_{z_1} - v_{z_{t-1}})^2] \quad (18)$$

where f is dependent on $\beta := [\beta_0 \ \beta_1 \ \beta_2 \ \beta_3]$.

The Jacobian matrix is given by:

$$J = \begin{bmatrix} \frac{\partial f}{\partial \beta_0} & \cdots & \frac{\partial f}{\partial \beta_3} \end{bmatrix} \quad (19)$$

A gradient descent algorithm is provided below:

```
given an initial point β ∈ dom f                                    (20)
while iterate till stoppage criterion met do
    1) find the descent direction using Jacobian J
    2) choose step size ξ using exact or backtracking line
search
    3) update β := β + −J ξ
end while
```

The stopping criterion is $\|J\|_2 < \eta$, where $\eta$ is a small positive constant. The exact details of backtracking or exact line search algorithms can be found in other art. Once the solution $\beta^*$ is found, equation 15 may be used to find the range of the object for all times $t_i$. The result may be described in spherical coordinates, and thus may be converted to Cartesian coordinates in the camera system, and in an additional or alternative embodiment, then to world coordinates.

FIG. 6 illustrates a flowchart of an example method 700, in accordance with one embodiment. The method 700 may be performed by any suitable system, apparatus, or device; for example, the system 100 of FIGS. 1, 2 and 3 may perform one or more of the operations associated with the method 700. Although illustrated with discrete blocks, the steps and operations associated with one or more of the blocks of the method 700 may be divided into additional blocks, combined into fewer blocks, or eliminated, depending on the desired implementation.

At block 702, the method may include detecting an object within a field of view of a radar using a radar signal. For example, radar device 110 may detect the presence of an object using a reflected Doppler radar signal as the object (e.g., baseball 206) enters the field of view.

At block 704, the method may include tracking a motion of the object through the field of view of the radar. For example, the motion of the baseball 206 may be tracked using radar signaling over a period of time as the baseball 206 traverses through a distance 214.

At block 706, the method may include triggering a camera to capture a plurality of images of the object based on tracking the motion of the object. For example, system 100 may determine that a pre-determined triggering threshold has been satisfied, such as detecting the entrance of the baseball 206 into the radar's field of view. As a result, camera 120 may be triggered to begin taking a series of photographs as the baseball continues to move throughout the radar's (and now also the camera's) field of view.

At block 708, the method may include detecting the object in the plurality of images. For example, the camera 120 may take a series of photographs over a pre-determined period of time, or until a pre-determined threshold has been met. The photographs may be analyzed by system 100 to determine the location of the baseball 206 throughout the series of photographs.

At block 710, the method may include combining data of the radar signal with data of the camera to estimate a position of the object. For example, the camera data and the radar data may be fused to determine the coordinates of the ball as well as parameters associated with the trajectory of the baseball's path, in order to estimate a position of the baseball at each estimated time.

At block 712, the method may include identifying a radar signal track generated by the motion of the object based on the combined data. At block 714, the method may include estimating a trajectory of the object based on identifying the radar signal track. For example, based on the fused data, and the calculated and estimated location and parameters, the trajectory of the baseball 206 may be estimated and stored for later analysis. In the case of later analysis, the calculations may be used to further adjust and refine later trajectory estimations.

Accordingly, the method 700 may be used to analyze a moving object. Modifications, additions, or omissions may be made to the method 700 without departing from the scope of the present disclosure. For example, the operations of method 700 may be implemented in different order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. All of the examples provided above are non-limiting and merely serve to illustrate the flexibility and breadth of the present disclosure.

Figure 8:
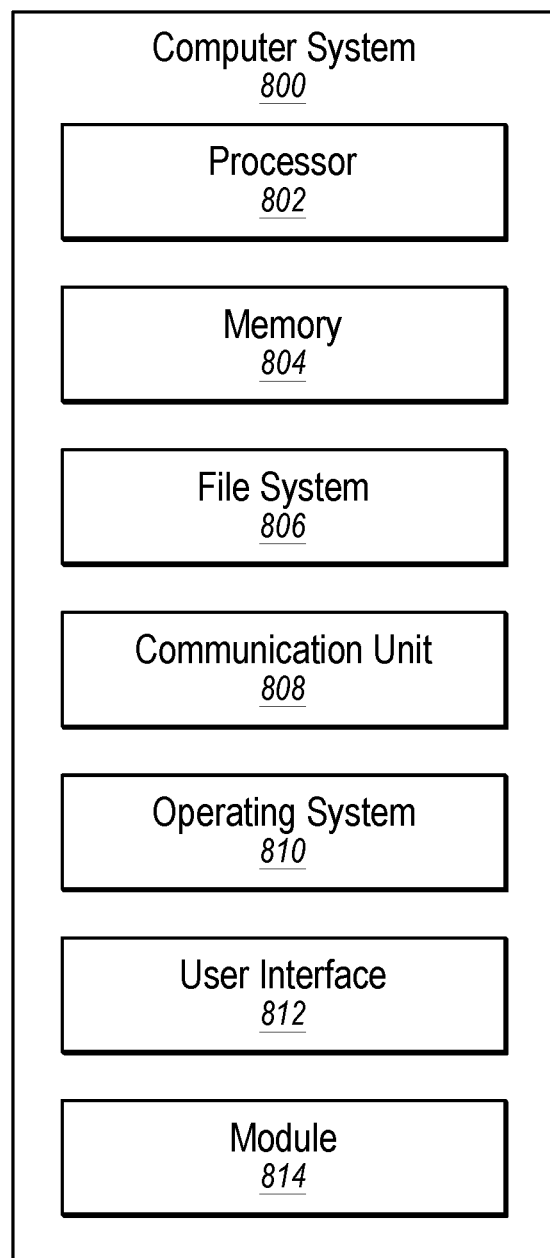
FIG. 8 illustrates an example computer system for use in radar and camera-based data fusion, in accordance with one embodiment.

FIG. 8 illustrates an example computer system that may be employed in ultrasonic communications. In some embodiments, the computer system 800 may be part of any of the systems or devices described in this disclosure. For example, the computer system 800 may be part of any of the system 100 of FIGS. 1-3 and/or system 600 of FIG. 6.

The computer system 800 may include a processor 802 (which may include processor 130 of FIG. 1), a memory 804 (which may include memory 140 of FIG. 1), a file system 806, a communication unit 808, an operating system 810, a user interface 812, and a module 814, which all may be communicatively coupled. In some embodiments, the computer system may include, for example, a desktop computer, a client computer, a server computer, a mobile phone, a laptop computer, a smartphone, a smartwatch, a tablet computer, a portable music player, a networking device, or any other computer system.

Generally, the processor 802 may include any computer, computing entity, or processing device including various computer hardware or software modules and may be configured to execute instructions stored on any applicable computer-readable storage media. For example, the processor 802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 802 may interpret and/or execute program instructions and/or process data stored in the memory 804 and/or the file system 806. In some embodiments, the processor 802 may fetch program instructions from the file system 806 and load the program instructions into the memory 804. After the program instructions are loaded into the memory 804, the processor 802 may execute the program instructions. In some embodiments, the instructions may include the processor 802 performing one or more of the actions of the methods 400 and/or 700 described with reference to FIGS. 4 and 7, respectively.

The memory 804 and the file system 806 may include computer-readable storage media for carrying or having stored thereon computer-executable instructions or data structures. Such computer-readable storage media may be any available non-transitory media that may be accessed by a general-purpose or special-purpose computer, such as the processor 802. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 802 to perform a certain operation or group of operations, such as one or more of the actions of the methods 400 and/or 700 described with reference to FIGS. 4 and 7, respectively.

The communication unit 808 may include any component, device, system, or combination thereof configured to transmit or receive information over a network. In some embodiments, the communication unit 808 may communicate with other devices at other locations, the same location, or even other components within the same system. For example, the communication unit 808 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 808 may permit data to be exchanged with a network and/or any other devices or systems, such as those described in the present disclosure.

The operating system 810 may be configured to manage hardware and software resources of the computer system 800 and configured to provide common services for the computer system 800.

The user interface 812 may include any device configured to allow a user to interface with the computer system 800. For example, the user interface 812 may include a display, such as an LCD, LED, or other display, that is configured to present video, text, application user interfaces, and other data as directed by the processor 802. The user interface 812 may further include a mouse, a track pad, a keyboard, a touchscreen, volume controls, other buttons, a speaker, a microphone, a camera, any peripheral device, or other input or output device. The user interface 812 may receive input from a user and provide the input to the processor 802. Similarly, the user interface 812 may present output to a user.

Figure 7:
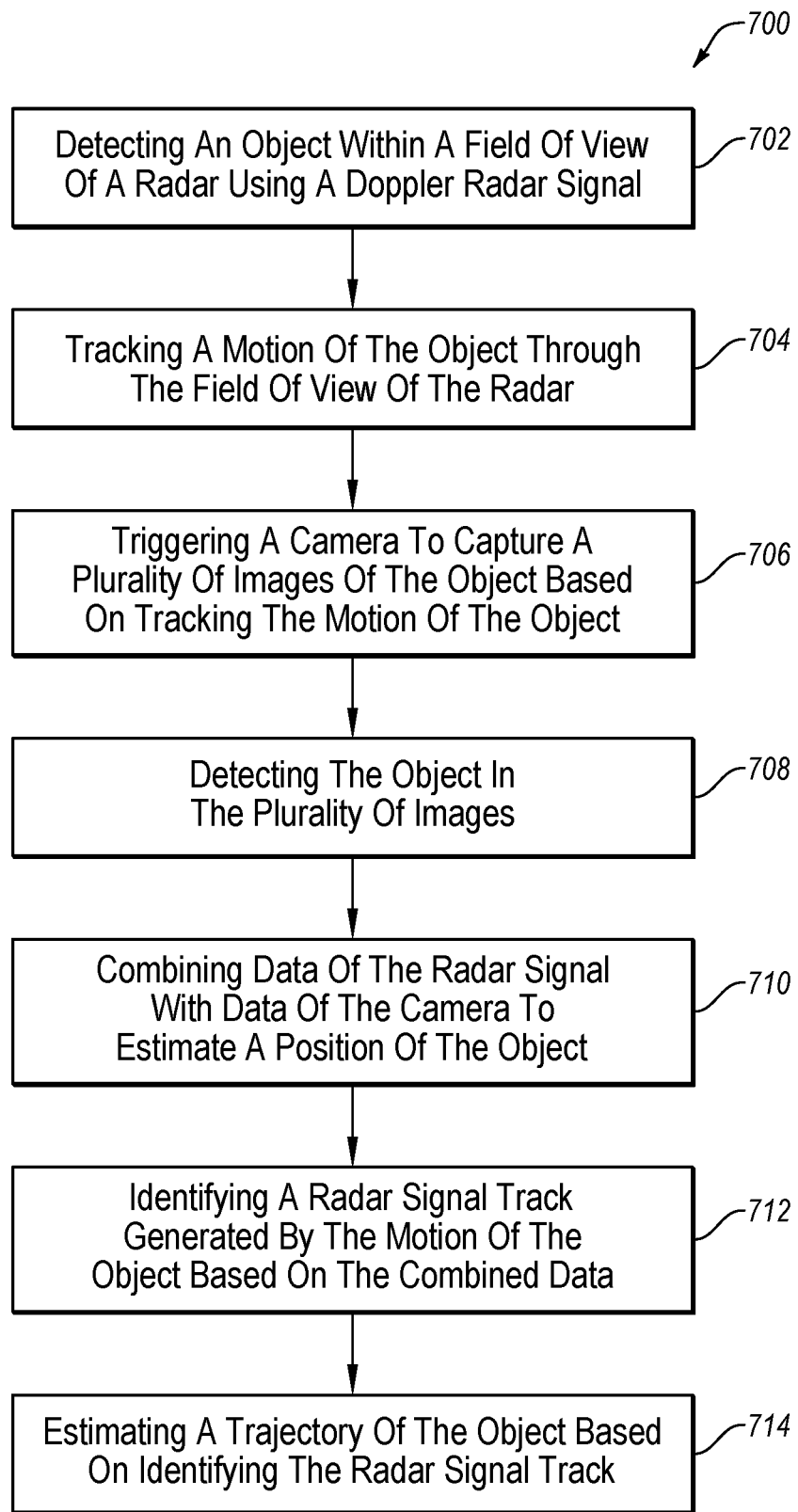
FIG. 7 illustrates a flowchart of an example method for radar and camera-based data fusion, in accordance with one embodiment.

The module 812 may be one or more computer-readable instructions stored on one or more non-transitory computer-readable media, such as the memory 804 or the file system 806, that, when executed by the processor 802, is configured to perform one or more of the actions of the methods 400 and/or 700 described with reference to FIGS. 4 and 7, respectively. In some embodiments, the module 814 may be part of the operating system 810 or may be part of an application of the computer system 800, or may be some combination thereof.

Modifications, additions, or omissions may be made to the computer system 800 without departing from the scope of the present disclosure. For example, although each is illustrated as a single component in FIG. 8, any of the components 802-814 of the computer system 800 may include multiple similar components that function collectively and are communicatively coupled. Further, although illustrated as a single computer system, it is understood that the computer system 800 may include multiple physical or virtual computer systems that are networked together, such as in a cloud computing environment, a multitenancy environment, or a virtualization environment.

As indicated above, the embodiments described herein may include the use of a computer (e.g., the processor 130 of FIG. 1) including various computer hardware or software modules, as discussed in greater detail below. Further, as indicated above, embodiments described herein may be implemented using computer-readable media (e.g., the memory 404 or file system 140 of FIG. 1) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by hardware), specific hardware implementations or a combination of software and specific hardware implementations are also possible and contemplated. In the present description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    detecting an object within a field of view of a radar using a radar signal;
    tracking movement of the object through the field of view of the radar;
    triggering a camera to capture a plurality of images of the object based on the movement of the object;
    detecting the object in the plurality of images;
    combining data of the radar signal with data of the camera to estimate a position of the object;
    identifying a radar signal track generated by the motion of the object based on the combined data;
    estimating a trajectory of the object based on identifying the radar signal track.

2. The method of claim 1, wherein triggering the camera further comprises:
    determining a pre-determined amount of time has passed since an onset of tracking the movement of the object; and
    triggering the camera to capture the plurality of images based on a passage of the pre-determined amount of time.

3. The method of claim 1, wherein triggering the camera further comprises:
    determining an amplitude of a radar signal associated with tracking the movement of the object; and triggering the camera to capture the plurality of images based on determining the amplitude of the radar signal.

4. The method of claim 1, wherein triggering the camera further comprises:
determining a pattern of a radar signal associated with tracking the motion of the object;
matching the pattern of the radar signal to a previously known pattern stored in memory; and
triggering the camera to capture the plurality of images based on matching the pattern of the radar signal with the previously known pattern.

5. The method of claim 1, wherein triggering the camera further comprises:
detecting the movement of a second object associated with the object; and
triggering the camera to capture the plurality of images based on detecting the movement of the second object.

6. The method of claim 1, wherein identifying the radar signal track further comprises:
generating a Doppler radar signal corresponding to a radial velocity of the object.

7. The method of claim 1, wherein estimating the position of the object further comprises:
determining an elevation and an azimuth angle of the object in three-dimensional spherical coordinates.

8. The method of claim 7, further comprising:
converting the position of the object from three-dimensional spherical coordinates to Cartesian coordinates.

9. The method of claim 1, wherein estimating the trajectory of the object further comprises:
determining an object speed, a vertical launch angle, a horizontal launch angle, or a combination thereof.

10. The method of claim 1, further comprising:
determining a point of interest associated with the object, the object having an irregular profile, wherein triggering the camera further comprises:
triggering the camera and a second camera to capture the plurality of images of the object.

11. The method of claim 1, wherein detecting the object further comprises:
detecting the object located closest to a radar system associated with the field of view of the radar.

12. A system, comprising:
a processor;
a radar device in electronic communication with the processor;
a camera in electronic communication with the processor;
memory in electronic communication with the processor;
instructions stored in the memory, the instructions being executable by the processor to:
detect an object within a field of view of a radar using a radar signal;
track movement of the object through the field of view of the radar;
trigger a camera to capture a plurality of images of the object based on the movement of the object;
detect the object in the plurality of images;
combine data of the radar signal with data of the camera to estimate a position of the object;
identify a radar signal track generated by the motion of the object based on the combined data;
estimate a trajectory of the object based on identifying the radar signal track.

13. The system of claim 12, wherein when the processor triggers the camera, the instructions are further executable to:
determine a pre-determined amount of time has passed since an onset of tracking the movement of the object; and
trigger the camera to capture the plurality of images based on a passage of the pre-determined amount of time.

14. The system of claim 12, wherein when the processor triggers the camera, the instructions are further executable to:
determine an amplitude of a radar signal associated with tracking the movement of the object; and
trigger the camera to capture the plurality of images based on determining the amplitude of the radar signal.

15. The system of claim 12, wherein when the processor triggers the camera, the instructions are further executable to:
determine a pattern of a radar signal associated with tracking the movement of the object;
match the pattern of the radar signal to a previously known pattern stored in memory; and
trigger the camera to capture the plurality of images based on matching the pattern of the radar signal with the previously known pattern.

16. The system of claim 12, wherein when the processor triggers the camera, the instructions are further executable to:
detect the movement of a second object associated with the object; and
trigger the camera to capture the plurality of images based on detecting the movement of the second object.

17. The system of claim 12, wherein when the processor identifies the radar signal track, the instructions are further executable to:
generate a Doppler radar signal corresponding to a radial velocity of the object.

18. The system of claim 12, wherein when the processor estimates the position of the object, the instructions are further executable to:
determine an elevation and an azimuth angle of the object in three-dimensional spherical coordinates.

19. The system of claim 18, wherein the instructions are further executable by the processor to cause the system to:
convert the position of the object from three-dimensional spherical coordinates to Cartesian coordinates.

20. A non-transitory computer-readable medium storing computer-executable code, the code executable by a processor to cause a system to:
detect an object within a field of view of a radar using a radar signal;
track movement of the object through the field of view of the radar;
trigger a camera to capture a plurality of images of the object based on the movement of the object;
detect the object in the plurality of images;
combine data of the radar signal with data of the camera to estimate a position of the object;
identify a radar signal track generated by the motion of the object based on the combined data;
estimate a trajectory of the object based on identifying the radar signal track.

* * * * *